Feb. 17, 1959 C. J. GARLAND ET AL 2,873,523
TILE CUTTING AND FUSING TOOL
Filed Sept. 21, 1953
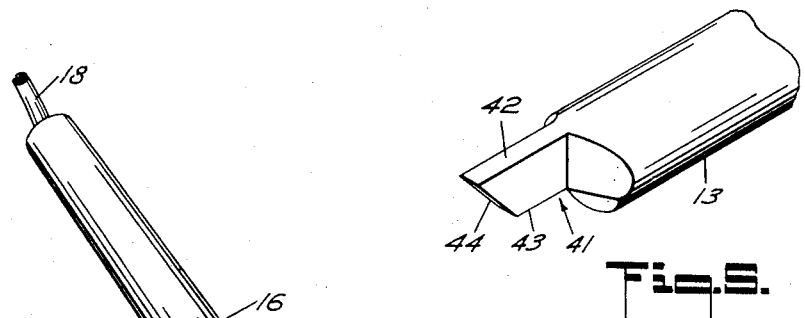
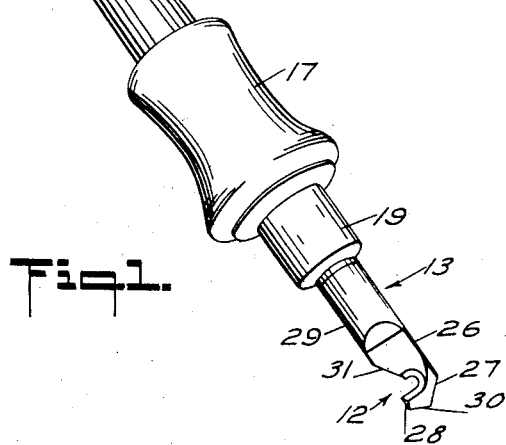
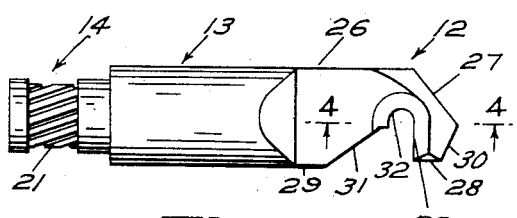
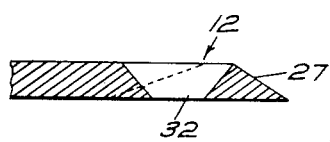
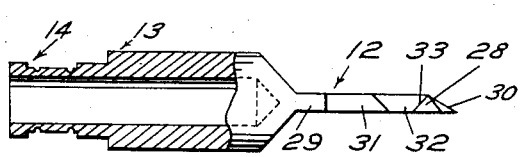
INVENTOR
CHARLES J. GARLAND &
D. WAYNE TURNER
BY
ATTORNEYS and Patented Feb. 17, 1959

2,873,523

TILE CUTTING AND FUSING TOOL

Charles J. Garland and Delmer Wayne Turner, Oakland, Calif., assignors to Merritt Engineering Co., Oakland, Calif., a corporation of California Application September 21, 1953, Serial No. 381,292

2 Claims. (Cl. 30—140)

This invention relates to devices which may be utilized in the installation of plastic wall tile, and more particularly towards a tool which is capable of cutting and trimming individual tiles as well as for fusing or welding abutting tile faces together.

Heretofore, the application of plastic tile to a wall surface presented innumerable problems, particularly in connection with cutting the tiles in circular or other irregular forms to accommodate the particular installation. Furthermore, it has been found that where the wall surface was at all irregular, the corners of the tiles have a tendency to break away from the wall, thus permitting the undesirable entry of water or moisture between or behind the respective tiles.

Accordingly, it is an object of the present invention to provide a tool which is capable of readily cutting a plastic tile, such tool facilitating the making of straight or curved cuts.

Another object of the invention is to provide a tool of the character described which is so designed that the user may easily follow any cutting guide line marked on the tile, and which is capable of cutting the tile along such a guide line with a minimum of manual effort by the operator.

A further object of our invention is to provide a tool of the character above mentioned which will produce smooth cuts and eliminate the bead normally encountered in most tile cutting operations.

A still further object of the invention is to provide a tile tool which is capable of fusing or welding abutting tile faces together after the respective tiles have been installed so as to prevent leaks or seepage between the tiles.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a perspective view of the tile cutting tool of the present invention.

Figure 2 is a side elevational view of the tool.

Figure 3 is a bottom plan view, partly in section, of the structure seen in Figure 2.

Figure 4 is a cross-sectional view taken substantially in the plane indicated by line 4—4 of Figure 2.

Figure 5 is a perspective view of a modified form of tile tool.

During the past few years, plastic tiles have been widely used for covering all or a portion of a wall surface. Generally, such tiles are made from polystyrene or similar plastic material, and are provided in relatively flat square sheets or tiles, such plastic tiles being secured to the wall surface by a suitable adhesive mastic. It will be appreciated that such tiles must, in some instances, be scored or cut in order to have the same fit into a space smaller than that of the tile, and under some circumstances, arcuate or other irregular cuts must be made in order to have the tile fit around pipe fittings or the like.

The tool of the present invention is arranged to accomplish the foregoing in a rapid and convenient manner. As best seen in Figure 1 of the drawing, such tool generally includes a cutting head 12, a shank 13, and means 14 for establishing electrical connection whereby the head may be heated to facilitate its cutting potentials. The tool is arranged to be operatively installed in an elongated handle member 16 having a heat-resistant manually engageable portion 17 thereon made of asbestos or the like. Member 16 is of generally hollow construction to include an electrical conduit 18 and one end 19 thereof is internally threaded to releasably engage the threaded distal end portion 21 of shank 13. In this manner suitable electrical connection may be made from the conduit 18 to the tool itself.

As will be understood, by heating the tool head, the tile on which the tool is being used will be more easily cut or fused, depending upon the particular operation being performed. Although the tool head may possess a variety of different shapes, the particular configuration shown in Figures 1 to 4 of the drawing has been found to possess features of advantage heretofore unavailable in prior art devices. As will be noted, head 12 is of generally hook-shaped form with a top 26 extending generally parallel to shank 13 and thence bending downwardly in sloping portions 27 and 30 to terminate in an end 28. A bottom 29 extends from shank 13 generally parallel to the top 26 for a short distance and then slopes upwardly as at 31. End 28 is connected to sloping portion 31 by means of a substantially semi-circular portion 32 and an extension 33 disposed generally normal to top 26 and bottom 29. It will further be noted that portions 32, 33 and 27 are preferably beveled on one side thereof so as to present a relatively knife edge to a tile surface being operated on.

When it is desirable to score the tile, the heated portion 27 is run along the desired line and the tile may then be broken along such scored line very easily. On the other hand, when it is desired to cut completely through the tile, either along a straight or curved path, portions 32 and 33 are utilized. In practice, the tool is hooked over a tile and the heated beveled surface of such portions is moved along the cutting path. In some instances, the cutting operation might result in leaving a bead adjacent the cut, but by reversing the tool head, such bead may be scored in the above mentioned manner so as to leave a smooth finished surface.

It is interesting to note that the juncture of end portion 28 and extension 33 extends beyond the intersection of sloped portion 31 with the semi-circular portion 32. This offset relationship is utilized to permit the head to be placed adjacent a rear surface of the tile with the hook overlying the same. By marking a line on the front surface of the tile, end 28 may be used as a guide for moving the cutting portion along the marked line to sever the tile. Thus, the line will at all times be readily visible and not covered by the tool, and will assist the workman in making rapid and positive cuts.

Earlier in this specification, it was stated that despite the mastic being used, there is a tendency for the tiles to have their respective corners pop out after they have been secured to a wall surface. This is due in part to the relative resiliency of a plastic tile, and further results from the application of the tiles to an irregular wall surface. By using a heated tool, the head of the latter may be moved along the line of intersection of the tiles and actually weld or fuse the tiles together. This will result in the respective tiles being joined into a substantially continuous waterproof panel. While head portions 26 and 27 could be utilized to accomplish the foregoing, we prefer to use a tool head 41 such as shown in Figure 5 of the drawing, which extends from a shank 13 in the same manner as head 12.

The tool head has a flat upper surface 42 and flat lower surface 43, disposed in parallel relation, with the latter being shorter than the former and connected thereto by an upwardly and forwardly sloping portion 44. Preferably, no bevels are used, and the thickness of the head will depend on the particular installation. In practice, the portion 44 is moved along the abutting surfaces of the tiles, and the head will result in a positive fusion between the surfaces.

We claim:

1. A plastic tile cutting tool including a shank and an integrally formed longitudinally extending head member, said head member having a narrow thickness relative to the thickness of said shank, said head member further having a relatively flat upper surface and a forwardly and upwardly directed lower surface extending from adjacent an end of said shank, said head member having a semi-circular cut out concave portion having an end thereof adjacent the distal portion of said lower surface and the other end thereof continuing in a relatively straight portion substantially normal to the axis of said shank, said concave portion having a sharpened edge, and means on said shank for connection to an electrical source for heating said shank and head member and for mounting said tool in a manually engageable handle.

2. Apparatus as set forth in claim 1 in which the forward portion of said tool is provided with a sharpened portion angularly related to the axis of said shank and to said straight portion.

References Cited in the file of this patent

UNITED STATES PATENTS

| | | |
|---|---|---|
| 318,211 | Seaman | May 19, 1885 |
| 1,328,547 | Shaw | Jan. 20, 1920 |
| 1,541,631 | Duffy | June 9, 1925 |
| 1,834,555 | Tittle | Dec. 1, 1931 |
| 1,993,472 | Borsari-Fischer | Mar. 5, 1935 |
| 2,304,559 | Engesser | Dec. 8, 1942 |
| 2,572,791 | White | Oct. 23, 1951 |
| 2,574,440 | Smith et al. | Nov. 6, 1951 |
| 2,600,067 | Merodian | June 10, 1952 |
| 2,654,122 | Derby | Oct. 6, 1953 |
| 2,701,835 | Anton | Feb. 8, 1955 |